United States Patent [19]

Terhune

[11] Patent Number: 4,767,128
[45] Date of Patent: Aug. 30, 1988

[54] WHEELBARROW CONSTRUCTION

[75] Inventor: John J. Terhune, Cochise County, Ariz.

[73] Assignee: T. Entrepreneur, Inc., Sierra Vista, Ariz.

[21] Appl. No.: 78,136

[22] Filed: Jul. 27, 1987

[51] Int. Cl.$^4$ .......................... B62B 1/18; B62B 1/24; B62B 3/12

[52] U.S. Cl. ................. 280/47.2; 280/47.31; 280/47.34; 280/62; 188/19

[58] Field of Search ............... 280/47.16, 47.17, 47.12, 280/47.24, 47.26, 47.30, 47.31, 47.33, 47.41, 62, 47.32; 188/29, 19, 21, 119, 167, 169; 298/1, 2 C

[56] References Cited

U.S. PATENT DOCUMENTS

| | | | |
|---|---|---|---|
| 736,697 | 8/1903 | Cummins | 280/43.24 |
| 931,096 | 8/1909 | Todd | 280/47.17 |
| 1,255,128 | 2/1918 | Bayley | 280/47.33 X |
| 1,407,690 | 2/1922 | Berry | 280/47.16 |
| 1,735,527 | 11/1929 | Cwik | 280/43.24 |
| 2,214,176 | 9/1940 | Portle | 188/21 X |
| 2,253,824 | 8/1941 | Townsend et al. | 188/21 X |
| 2,598,261 | 5/1952 | Hrabal | 280/47.17 |
| 3,061,049 | 10/1962 | Bramley | 280/33.99 C X |
| 3,532,188 | 10/1970 | Kelz | 188/29 X |
| 3,950,005 | 4/1976 | Patterson | 280/47.31 |

FOREIGN PATENT DOCUMENTS

| | | | |
|---|---|---|---|
| 747647 | 1/1932 | France | 280/47.17 |
| 851147 | 10/1960 | United Kingdom | 280/62 |

Primary Examiner—John J. Love
Assistant Examiner—Tamara L. Finlay
Attorney, Agent, or Firm—Henderson & Sturm

[57] ABSTRACT

An improved wheelbarrow construction (10) comprising: a receptacle unit (11); a forward wheel assembly (12); a main load support unit (13) having adjustable handle means (14); a rear wheel trailer unit (15) operatively connected to the main load support unit (13); and an automatic brake unit (16) and brake override means (17) interposed between said main load support unit (13) and said rear wheel trailer unit (15).

7 Claims, 2 Drawing Sheets

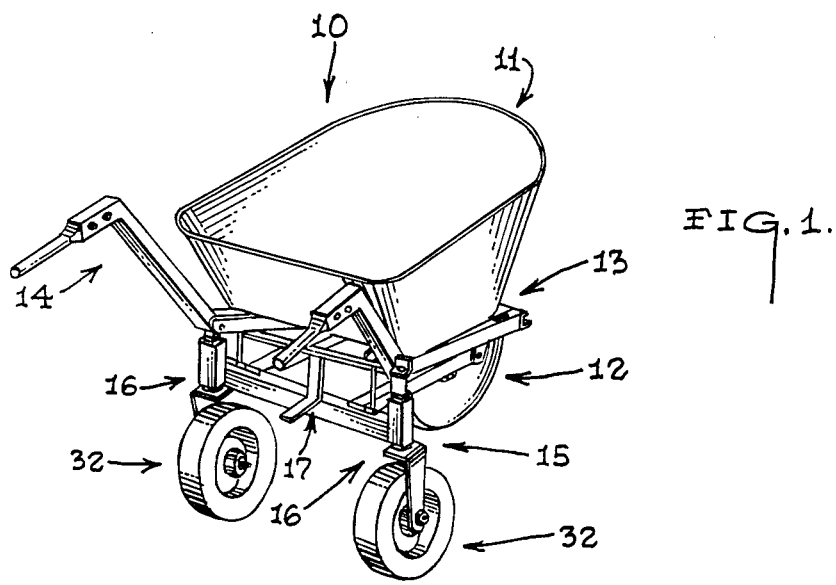
FIG. 1.
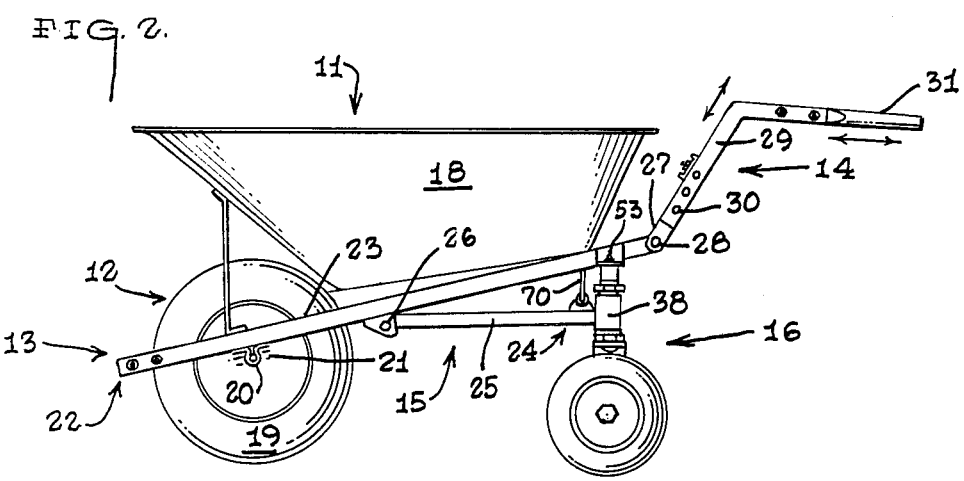
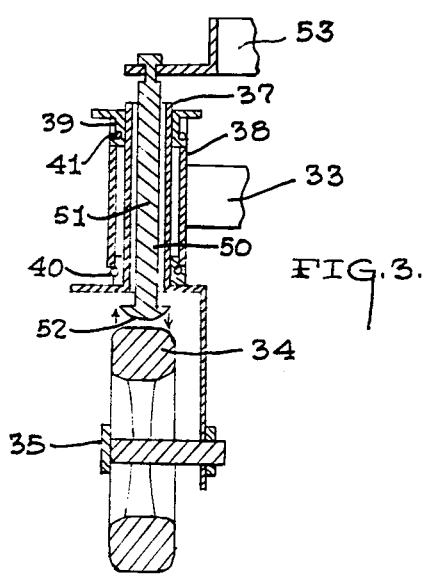
FIG. 3.
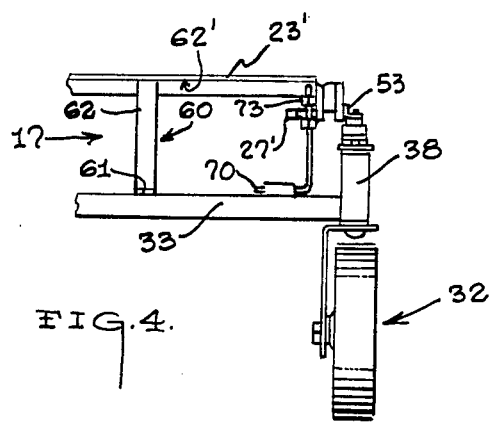
FIG. 4.

WHEELBARROW CONSTRUCTION

TECHNICAL FIELD

The present invention relates to the field of wheelbarrow constructions.

BACKGROUND OF THE INVENTION

The present invention was the basis of DDP Registration 150,530 filed in the U.S. Patent and Trademark Office on May 16, 1986.

The first major contribution of ancient mankind to todays technology was the discovery of the wheel. This monumental event was no doubt closely followed by the invention of the first crude wheelbarrow. Given the early origins of the wheelbarrow, it should not come as a startling revelation that down through the ages mankind has continually strived to improve upon this ancient and somewhat humble wheeled apparatus.

It should also not come as a surprise that the patent literature is replete with myriad and diverse structures that have been developed in an attempt to produce the "ultimate" wheelbarrow. Representative examples of these prior art constructions may be seen by reference to the following U.S. Pat. Nos. 736,697; 1,407,690; 1,735,527; and, 2,598,261.

As can be seen by reference to the aforementioned patents, while all of the prior art wheelbarrows are more than adequate for their intended purpose and function, they certainly do not represent the culmination of the inventive process with respect to this particular area of technology. As a consequence of the foregoing situation, continuing attempts have been undertaken to render improvements to the basic wheelbarrow construction, and the present invention represents the end product of only one of those continuing attempts.

SUMMARY OF THE INVENTION

The wheelbarrow construction that represents the basis of the present invention obviously incorporates some of the basic structural components found in all typical wheelbarrow constructions, such as an enlarged front wheel member mounted on an axle wherein the axle is operatively associated with a pair of handle members which are attached to a load bearing receptacle.

While the aforementioned standard structural components are also to be found in the wheelbarrow construction of the present invention, these standard components are further complemented by the addition of a dual rear wheel assembly and an automatic brake mechanism provided with a brake override means that will selectively disable the automatic brake mechanism.

In addition, the wheelbarrow construction of this invention further includes a rear wheel trailer frame assembly that is pivotally secured on one end to the handle members, wherein the automatic brake assembly is disposed on the other end of the trailer frame assembly intermediate the handle members and the trailer frame assembly.

In the normal mode of operation the automatic brake mechanism is gravity operated and assisted by the weight of the load bearing receptacle and its contents. When the user wishes to temporarily disengage the brake mechanism, all that is required is the application of an upwardly or forwardly directed force sufficient to lift the brake pad plungers of the brake mechanism out of engagement with the rear wheels.

As long as the requisite upwardly or forwardly directed application of force is maintained, the wheelbarrow will function as a three wheeled wheelbarrow, in as much as, the wheelbarrow load is being supported by the enlarged front wheel and the rear wheels. In this mode of operation the operator can apply the braking force of the automatic brake mechanism by reducing the upwardly or forwardly directed force, to selectively and/or progressively apply the braking pressure being exerted on the rear wheels by the brake pad plungers.

When the rear wheels are lifted above the ground, this invention functions as a conventional one-wheeled wheelbarrow. However, whenever the handles of the wheelbarrow are released or dropped, the brake mechanism is automatically actuated to restrain the rear wheels of the wheelbarrow, until such time as the handles are moved upwardly or forwardly to release the brake mechanism so that the wheelbarrow will operate in the three wheel mode.

When the brake override means of this invention is employed, the wheelbarrow construction functions continuously as a three wheeled wheelbarrow, in that the wheelbarrow load will be distributed among the three wheels, both at rest and as the wheelbarrow is being rolled across a surface with the brake mechanism being held out of engagement with the rear wheels.

Due to the unique cooperation of the structural components employed in this invention, this new wheelbarrow construction affords the user a variety of modes of deployment that can be chosen to satisfy the requirements of diverse particular tasks.

BRIEF SUMMARY OF THE DRAWINGS

These and other objects, advantages and novel features of the invention will become apparent from the detailed description of the best mode for carrying out the preferred embodiment of this invention which follows; particularly when considered in conjunction with the accompanying drawings, wherein:

FIG. 1 is a perspective view of the wheelbarrow construction of this invention;

FIG. 2 is a side plan view of the wheelbarrow construction;

FIG. 3 is an enlarged detail view of the automatic brake mechanism of this invention;

FIG. 4 is an isolated detail view of the location of the brake override means of this invention;

BEST MODE FOR CARRYING OUT THE INVENTION

Figure 5:
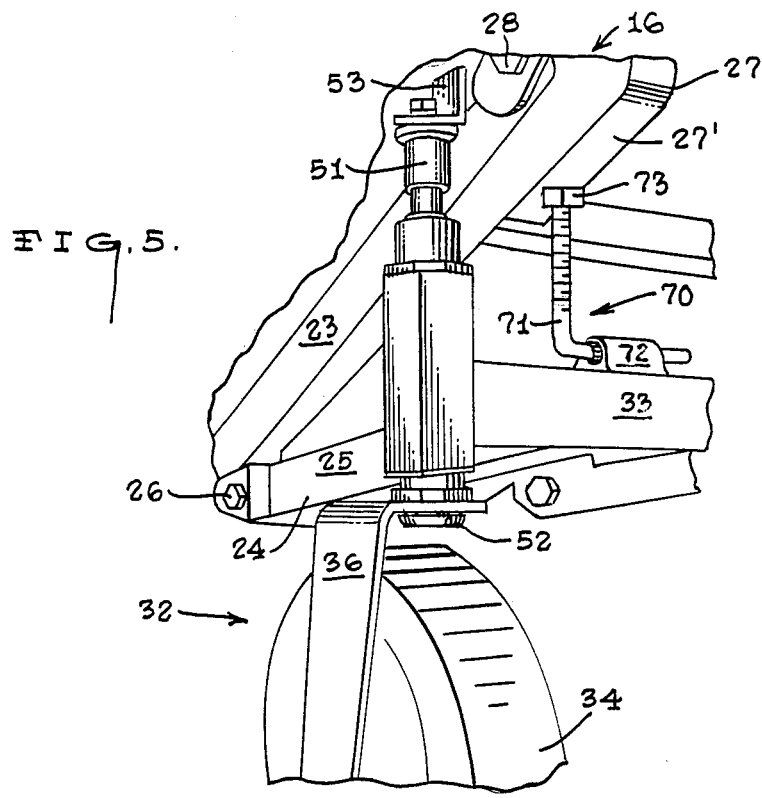
FIG. 5 is an enlarged detail view of the brake in its retracted mode.

As can be seen by reference to the drawings and in particular to FIGS. 1 and 2, the wheelbarrow construction that forms the basis of the present invention is designated generally by the reference numeral (10). The wheelbarrow construction (10) comprises in general: a receptacle unit (11); a forward wheel assembly (12); a main load support unit (13); adjustable handle means (14); a rear wheel trailer unit (15); an automatic main brake unit (16); and an optional brake override means (17). The aforementioned means and units will now be described in seriatim fashion.

As can best be seen by reference to FIG. 2, the receptacle unit (11) comprises an enlarged receptacle body (18) operatively connected to the main load support unit (13), which in turn is supported by the forward wheel assembly (12).

The forward wheel assembly (12) comprises an enlarged wheel member (19) rotatably disposed on an axle member (20), wherein the axle member (20) is operatively connected in a well recognized fashion to the main load support unit (13) via an axle yoke element (21).

The main load support unit (13) comprises a first generally U-shaped frame member (22) having a pair of rearwardly extending support arms (23), which are each provided with an adjustable handle means (14). In addition, the rear wheel trailer unit (15) comprises a second generally U-shaped frame member (24) having a pair of forwardly extending support arms (25), which are pivotally secured as at (26) to the first frame member (22).

Each of the adjustable handle means (14) comprises: an inboard bracket element (27) pivotally secured as at (28) to the end of each support arm (23); an angled intermediate handle section (29) provided with a plurality of apertures (30) on each end, and an elongated hand grip element (31). The adjustable handle means (14) further comprises suitable securing means (not shown) that cooperate with the plurality of apertures (30) in the intermediate handle section (29); whereby, the intermediate handle section (29) and the hand grip element (31) may be moved relative to one another and to the inboard bracket element (27), in a well recognized manner.

As shown in FIGS. 2, 3, 5, and 6, the rear wheel trailer unit (15) further comprises a pair of swivel caster wheel assemblies (32) operatively connected to the second frame member (24) at the juncture of the frame member support arms (25) with the frame member cross-piece (33). Each of the caster wheel assemblies (32) further comprise a caster wheel (34) and axle (35) operatively connected to a wheel support bracket (36) having a hollow tubular caster swivel shaft (37) projecting upwardly therefrom.

In addition, the operative connection between the caster wheel assemblies (32) and the rear wheel trailer unit (15) comprises: a generally cylindrical housing member (38), formed on the outboard ends of the frame member cross-piece (33) which projects beyond the forwardly extending support arms (25); and an upper (39) and lower (40) bearing assembly provided on opposite ends of the cylindrical housing member (38), wherein the upper bearing assembly (39) is further provided with a bearing retainer element (41), that is operatively connected to the upper end of the caster swivel shaft (37).

Figure 6:
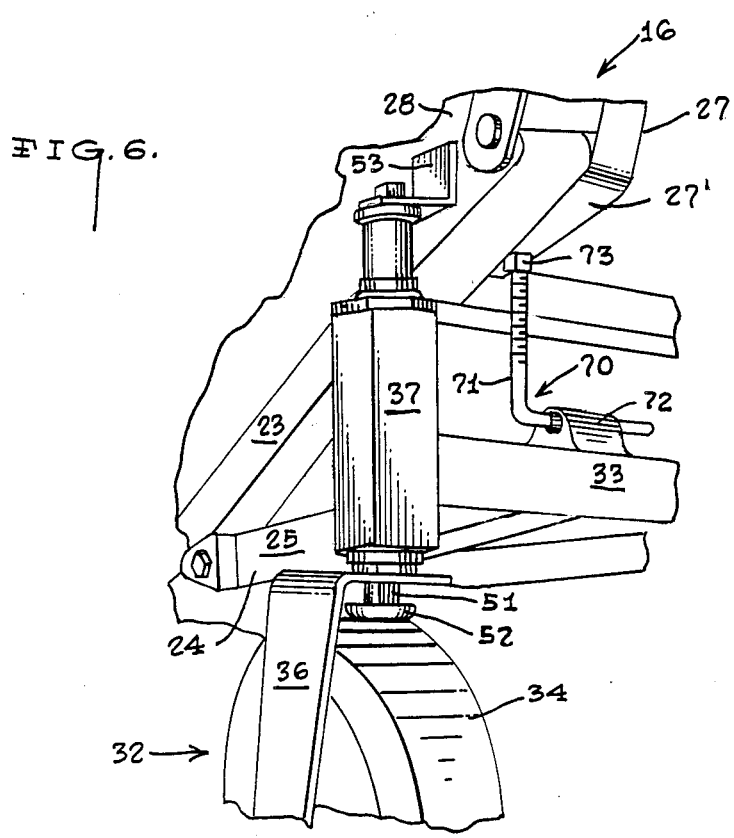
FIG. 6 is an enlarged detail view of the brake mechanism in its engaged mode.

Referring particularly to FIGS. 3, 5, and 6, it can be seen that the automatic brake unit (16) comprises an elongated brake plunger element (50) comprising an elongated plunger shaft (51) having an enlarged brake pad (52) formed on the lower end of the plunger shaft (51), wherein the upper end of the plunger shaft is operatively secured to the main load support unit (13) via a bracket member (53); the intermediate portion of the plunger shaft (51) is dimensioned to freely reciprocate within the hollow caster swivel shaft (37); and, the effective length of the plunger shaft (51) is sufficient to bring the brake pad (52) into braking engagement with the caster wheels (34) in the absence of an upwardly or forwardly directed force being applied to the main load support unit (13) as will be explained in greater detail further on in the specification.

As can best be appreciated by reference to FIG. 4, the optional brake override means (17) is disposed on the rear of the wheelbarrow construction (10) intermediate the main load support unit (13) and the rear wheel trailer unit (15). The brake override means (17) further comprises in general: a generally L-shaped pivoted bracket member (60), wherein one of the legs of the bracket member (60) forms an actuating lever (61), and the other leg of the bracket member (60) forms a support brace (62).

As can also be seen by reference to FIG. 4, the frame member (22) of the main load support unit (13) is further provided with a cross-piece element (23') which extends between and is rigidly secured to the outboard ends of the rearwardly projecting arms (23) of the first frame member (22) and forms a support brace contact surface (62').

As can be seen by reference to FIGS. 4 thru 6, each inboard bracket element (27) of the handle means (14) is provided with an enlarged forwardly extending fulcrum arm (27'). Each of the fulcrum arms (27') in turn is operatively connected to an adjustable spacer member (70) disposed proximate each end of the frame member cross-piece (33). The adjustable spacer member (70) comprises a generally L-shaped rod element (71) pivotally connected on one end to a yoke element (72) and provided with threads on the other end which cooperate with a plurality of threaded fasteners (73) to captively engage the fulcrum arm (27').

As can best be appreciated by reference to FIGS. 5 and 6, the automatic actuation and disengagement of the main brake unit (16) is governed and controlled by the disposition of the handle means (14) relative to the support arms (23). In the disengaged mode of the brake unit (16) illustrated in FIG. 5, the handle means (14) have been pivoted in a forward direction, whereby the fulcrum arm (27') has engaged the lower fastener (73) on the adjustable spacer member (70) to pivotally displace the support arms (23) in an upward direction so that the support arm bracket (53) will engage the upper end of the plunger shaft (51) to disengage the brake pad (52) from the wheel (34).

In the engaged mode of the brake unit (16) illustrated in FIG. 6, the handle means (14) have no external force being applied thereon, and the weight of the receptacle unit (11) and its contents are transmitted through the support arm bracket (53) to the brake pad (52) via the plunger shaft (51) whereby the brake pad (52) transmits the weight of the receptacle unit (11) onto the rear wheels (34).

In one mode of operation, the limited vertical movement of the main load unit (13) relative to the rear wheel trailer unit (15) is to accommodate the manual disengagement of the plunger brake pad (52) from the rear caster wheels (34) by the pivotal displacement of the fulcrum arm (27') on the adjustable handle means (14).

In the other mode of operation, the limited vertical movement of the main load unit (13) relative to the rear trailer unit (15) will accommodate the pivotal translation of the support brace (62) beneath the support brace contact surface (62') of the cross-piece element (23') to releasably disable the automatic brake unit (16).

When the brake override means (17) is to be engaged, the actuating lever (61) is rotated such that the support brace (62) is interposed between the main load support unit (13) and the rear wheel trailer unit (15), such that the brake pad (52) will be held out of engagement with the caster wheels (34). This cooperation between the main load support unit (13), the rear wheel trailer unit (15), and the brake override means (17) will be maintained until such time as the support brace (62) is disengaged It should further be noted that when the brake override means (17) is engaged, the wheelbarrow construction will function as a three wheeled wheelbarrow, in as much as the load contained within the enlarged receptacle body (18) will be distributed among the enlarged wheel member (19) and the rear caster wheels (34).

Having thereby described the subject matter of this invention it should be apparent that many substitutions, modifications, and variations of the invention are possible in light of the above teachings. It is therefore to be understood that the invention as taught and described herein is only to be limited to the breadth and scope of the appended claims.

I claim:

1. An improved wheelbarrow construction comprising:
   a receptacle unit including an enlarged receptacle body;
   a main load support unit operatively connected to said receptacle unit, and a first frame member having a pair of rearwardly extending support arms each provided with adjustable handle means;
   a forward wheel assembly operatively connected to said main support unit;
   a rear wheel trailer unit comprising a second frame member pivotally secured on one end to the main load support unit and provided on the other end with a pair of wheel assemblies; wherein each of said pair of wheel assemblies comprise: a caster wheel and axle operatively connected to a wheel support bracket having a hollow tubular caster swivel projecting upwardly therefrom;
   an automatic brake unit associated with each of the said pair of wheel assemblies, and comprising an elongated brake plunger element including an elongated plunger shaft mounted for reciprocation within the hollow tubular caster shafts of said wheel assemblies, secured on one end to said first frame member; and provided on the other end with an enlarged brake pad, which is adapted to releasably engage the pair of wheel assemblies, wherein the automatic brake unit is disposed intermediate the main load support unit and the rear wheel trailer unit wherein, said first and second frame members comprise generally U-shaped frame members, wherein the pair of rearwardly extending support arms have outboard ends and a cross-piece element that extends between said outboard ends, and the second frame member is provided with a pair of forwardly extending support arms; and
   a brake override means disposed intermediate the main load support unit and the rear wheel trailer unit, whereby the brake override means is adapted to hold the said elongated brake plunger element out of engagement with said pair of wheel assemblies to temperarily disable said automatic brake unit.

2. The improved wheelbarrow construction as in claim 1 wherein the brake override means comprises: a generally L-shaped bracket member, pivotally connected to the second frame member, wherein one of the legs of the bracket member forms an actuating lever and the other leg of the bracket member forms a support brace.

3. The improved wheelbarrow construction as in claim 2 wherein the main load support unit is vertically displaceable relative to the wheeled trailer unit and said support brace is dimensioned to engage the cross-piece element of the first frame member at a vertical height sufficient to disengage the said elongated plunger elements from contact with said pair of wheel assemblies.

4. The improved wheelbarrow construction as in claim 1 wherein the adjustable handle means comprise:
   a pair of inboard bracket elements pivotally secured to the outboard ends of the support arms on the main load support unit;
   angled intermediate handle sections operatively secured to each of the inboard bracket elements; and,
   elongated hand grip elements associated with each of the angled intermediate handle sections.

5. The improved wheelbarrow construction as in claim 4 wherein each of the inboard bracket elements is provided with an enlarged forwardly extending fulcrum arm which is operatively connected to said automatic brake unit.

6. The improved wheelbarrow construction as in claim 5 wherein the operative connection between the fulcrum arms and the automatic brake unit comprises:
   an adjustable spacer member disposed proximate each end of the cross-piece element of the first generally U-shaped frame member, 7. The improved wheelbarrow construction as in claim 6 wherein the adjustable spacer member comprises:
   a generally L-shaped rod element pivotally connected on one end to a yoke element that is mounted on said cross-piece element, wherein the other end of said rod element is provided with threads which cooperate with a plurality of threaded fasteners to captively engage said fulcrum arm.

* * * * *